United States Patent
Beer et al.

(10) Patent No.: US 12,019,150 B2
(45) Date of Patent: Jun. 25, 2024

(54) RADAR TARGET SIMULATION SYSTEM AND RADAR TARGET SIMULATION METHOD

(71) Applicant: Rohde & Schwarz GmbH & Co. KG, Munich (DE)

(72) Inventors: Matthias Beer, Munich (DE); Steffen Neidhardt, Munich (DE); Maximilian Bogner, Munich (DE); Benedikt Simper, Munich (DE); Gerhard Hamberger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 290 days.

(21) Appl. No.: 17/033,049

(22) Filed: Sep. 25, 2020

(65) Prior Publication Data

US 2022/0099824 A1    Mar. 31, 2022

(51) Int. Cl.
 *G01S 13/931*  (2020.01)
 *B60W 60/00*  (2020.01)
 (Continued)

(52) U.S. Cl.
 CPC ......... *G01S 13/931* (2013.01); *B60W 60/001* (2020.02); *G01S 7/40* (2013.01);
 (Continued)

(58) Field of Classification Search
 CPC .......... G01S 13/931; G01S 7/40; G01S 13/58; B60W 60/001; B60W 2554/20; B60W 2420/52; B60W 2420/60
 (Continued)

(56) References Cited

U.S. PATENT DOCUMENTS

| | | | |
|---|---|---|---|
| 3,018,478 A * | 1/1962 | Skillman | G01S 7/4021 367/1 |
| 3,982,244 A * | 9/1976 | Ward | G01S 7/4021 342/149 |

(Continued)

FOREIGN PATENT DOCUMENTS

| | | |
|---|---|---|
| EP | 3115804 A1 | 1/2017 |
| EP | 3260876 A1 | 12/2017 |
| WO | 2017/069695 A1 | 4/2017 |

*Primary Examiner* — Nuzhat Pervin
(74) *Attorney, Agent, or Firm* — CHRISTENSEN O'CONNOR JOHNSON KINDNESS PLLC (57) ABSTRACT

A radar target simulation system for simulating at least one radar target is disclosed. The radar target simulation system includes a processing circuit and an antenna array that is connected with the processing circuit. The antenna array is configured to receive a radar signal from a device under test, thereby generating an input signal. The processing circuit is configured to receive the input signal generated by the antenna array. The processing circuit is configured to simulate the at least one radar target based on the input signal. The processing circuit further is configured to simulate at least one additional event, wherein the at least one additional event is associated with at least one of the at least one radar target and an environment of the at least one radar target. The processing circuit is configured to generate an output signal for the antenna array based on the simulation of the at least one radar target and based on the simulation of the at least one additional event. Moreover, a radar target simulation method is described.

16 Claims, 2 Drawing Sheets

(51) Int. Cl.
    *G01S 7/40*         (2006.01)
    *G01S 13/58*       (2006.01)

(52) U.S. Cl.
    CPC ........ *G01S 13/58* (2013.01); *B60W 2420/408* (2024.01); *B60W 2420/60* (2013.01); *B60W 2554/20* (2020.02)

(58) Field of Classification Search
    USPC .......................................................... 342/70
    See application file for complete search history.

(56) References Cited

U.S. PATENT DOCUMENTS

| | | | | |
|---|---|---|---|---|
| 4,467,327 | A * | 8/1984 | Drake | F41G 7/003 434/2 |
| 4,660,041 | A * | 4/1987 | Maples | G01S 7/40 342/170 |
| 5,047,782 | A * | 9/1991 | Lew | G01S 7/4052 342/172 |
| 5,351,054 | A * | 9/1994 | Fredericks | G01S 13/913 342/170 |
| 5,457,463 | A * | 10/1995 | Vencel | G09B 9/54 342/170 |
| 9,002,427 | B2 * | 4/2015 | Tupin, Jr. | A61B 5/087 600/407 |
| 9,726,771 | B1 * | 8/2017 | Popovici | G01V 1/345 |
| 9,831,881 | B2 * | 11/2017 | Josefsberg | H03L 7/085 |
| 10,205,457 | B1 * | 2/2019 | Josefsberg | H03L 7/091 |
| 10,404,261 | B1 * | 9/2019 | Josefsberg | G01S 13/931 |
| 10,598,764 | B2 * | 3/2020 | Josefsberg | H03L 7/091 |
| 10,620,307 | B2 * | 4/2020 | Yavari | G01S 13/86 |
| 2007/0146634 | A1 * | 6/2007 | LeBlanc | A61B 3/156 351/221 |
| 2008/0186390 | A1 * | 8/2008 | Sato | G06T 3/4053 348/222.1 |
| 2012/0112093 | A1 * | 5/2012 | Rosen | G01J 3/44 356/369 |
| 2015/0241361 | A1 * | 8/2015 | Urano | G01N 21/9501 356/237.5 |
| 2016/0041092 | A1 * | 2/2016 | Urano | G01N 21/95623 356/237.5 |
| 2017/0010346 | A1 * | 1/2017 | Rolfsmeier | G01S 7/4052 |
| 2017/0010347 | A1 * | 1/2017 | Schütte | G01S 7/4052 |
| 2017/0052024 | A1 * | 2/2017 | Reece, Jr. | G01B 11/24 |
| 2017/0363719 | A1 * | 12/2017 | Ahmed | G01S 7/4052 |
| 2018/0203098 | A1 * | 7/2018 | Heuel | G01S 7/4052 |
| 2019/0039862 | A1 * | 2/2019 | Palberg | B66C 13/40 |
| 2019/0094834 | A1 * | 3/2019 | Bramberger | G06F 30/13 |
| 2020/0103496 | A1 * | 4/2020 | Konrad | G01S 7/4095 |
| 2020/0184027 | A1 * | 6/2020 | Dolan | G01S 13/931 |
| 2020/0278211 | A1 * | 9/2020 | Murakami | H04W 4/024 |
| 2020/0300968 | A1 * | 9/2020 | Gruber | G01S 7/4052 |
| 2021/0319313 | A1 * | 10/2021 | Warren | G06N 3/08 |
| 2021/0325895 | A1 * | 10/2021 | Huai | G05D 1/0221 |
| 2022/0048533 | A1 * | 2/2022 | Ödblom | G06F 11/3668 |

* cited by examiner

Fig. 1

RADAR TARGET SIMULATION SYSTEM AND RADAR TARGET SIMULATION METHOD

FIELD OF THE DISCLOSURE

Embodiments of the present disclosure generally relate to a radar target simulation system for simulating at least one radar target. Embodiments of the present disclosure further relate to a radar target simulation method for simulating at least one radar target.

BACKGROUND

Radar systems become ever more common in various use cases for person and cargo transport. While radar systems have been implemented into planes for a long time, the implementation of such radar systems in automotive applications becomes more and more important.

For example, those radar systems are used in driver assistance systems of a car, such as lane change assistants, brake assistants or adaptive cruise controls. The radar systems are also used in automatic driving systems that are configured to control the vehicle at least partially in an automatic manner, in particular autonomously.

In order to test these radar systems, the device under test, e.g. the car comprising the radar system or the radar system alone, usually is placed in a test chamber that comprises a radar target simulation system. The radar target simulation system simulates a radar target having a certain velocity and generates a corresponding radar signal that can be used to test characteristics of the radar system.

However, the simulation of a single radar target may not be sufficient in order to evaluate the performance of the radar system under real operation conditions, which are usually more complex.

Accordingly, there is a need for a radar target simulation system and a radar target simulation method that allow for testing radar systems in more complex scenarios.

SUMMARY

Embodiments of the present disclosure provide a radar target simulation system for simulating at least one radar target. In an embodiment, the radar target simulation system comprises a processing circuit or module and an antenna array that is connected with the processing module. The antenna array is configured to receive a radar signal from a device under test, thereby generating an input signal. The processing module is configured to receive the input signal generated by the antenna array. The processing module is configured to simulate the at least one radar target based on the input signal. The processing module further is configured to simulate at least one additional event, wherein the at least one additional event is associated with at least one of the at least one radar target and an environment of the at least one radar target. The processing module is configured to generate an output signal for the antenna array based on the simulation of the at least one radar target and based on the simulation of the at least one additional event.

The radar target simulation system according to the present disclosure is based on the idea to not only simulate the radar target, but to also simulate the additional event that is associated with the radar target or the environment of the radar target. Accordingly, the at least one additional event may take into account any environmental relationship(s) between the radar target simulated and the device under test.

In other words, an interaction among the radar target, its environment and/or the device under test is taken into consideration.

In general, the at least one additional event relates to a scenario deviating from a standard scenario, in which only the radar target would be simulated (in an ideal environmental scenario), wherein the radar target would be stationary or would move at a constant velocity. The at least one additional event is described in more detail below.

Thus, the radar target simulation system according to the present disclosure provides a more realistic simulation for testing the device under test, as the additional event provides a more realistic representation of a use case scenario of the device under test.

For example, the radar target may be a vehicle, a plane, a ship, another type of moving or stationary object, a cyclist, or a pedestrian, for example. Accordingly, the radar target simulated generally relates to a certain object with a defined radar cross section which depends on the respective scenario.

According to an aspect of the present disclosure, the additional event comprises at least one of a static object in the environment, a dynamic object in the environment, an effect associated with an acceleration of the radar target, a change of a radar cross section of the radar target, an effect associated with a three-dimensional movement of the radar target, a multipath propagation of a radar signal reflected by the simulated radar target, and an interference source generating an interference radar signal.

Therein and in the following, the term "acceleration" is understood to comprise both positive acceleration and negative acceleration, i.e. an increase of velocity and a decrease of velocity. In some embodiments, the term "acceleration" comprises starting of a vehicle, and deceleration of a vehicle, for example a braking maneuver.

Furthermore, the acceleration may be associated with a (simulated) relative movement of the device under test with respect to the radar target simulated. In some embodiments, a deceleration of the radar target simulated may relate to a scenario in which the device under test accelerates and the radar target scenario corresponds to a stationary object, as this results in a relative deceleration of the radar target simulated.

Generally, further effects occur due to movements in directions different to the acceleration direction during such an acceleration.

For example, the additional event is associated with a luffing during a starting of the radar target, i.e. an initial acceleration of the radar target. In other words, the respective effect associated with the acceleration corresponds to a luffing of the vehicle that takes place when starting the vehicle, namely a movement in a direction different to the direction of acceleration.

In some embodiments, the at least one additional event may comprise a yawing, pitching and/or rolling of the radar target during the acceleration or rather the three-dimensional movement. The yawing, pitching and/or rolling is associated with the luffing.

As mentioned above, the yawing, pitching and/or rolling of the radar target may simulate a respective yawing, pitching and/or rolling of the device under test in the scenario simulated.

In case that the device under test relates to a car with a radar system or rather the radar system to be installed in a car, the yawing, pitching and/or rolling may be simulated appropriately in order to simulate the behavior of the car when starting the car. Accordingly, an object in the field of view of the radar system appears to yaw, pitch and/or roll.

As a further example, the at least one additional event may be associated with an effect resulting from a sudden slowdown or stop of the radar target or rather the device under test, i.e. with a significant deceleration of the radar target or rather the device under test.

The term "multipath propagation of a radar signal reflected by the simulated radar target" is understood to denote a simulation of multiple reflections of the same radar signal. For example, the radar signal may be simulated to be first reflected by the radar target, and then by one or more further objects in the environment, such as trees, tunnel walls, etc. Accordingly, the additional event corresponds to noise that depends on the radar target scenario simulated due to the respective environment. For instance, the car may be driven on a road with less trees, namely a highway, or rather a road with many trees, namely an alley, which results in less or more reflections and, therefore, different multipath propagation scenarios.

In a similar manner, the walls of a tunnel also have an influence on the radar target scenario used for testing.

In general, the interference source may be any source of radar waves that have an equal or similar wavelength as the radar waves generated or received by the device under test. For example, the interference source may be another electronic device transmitting on an equal or similar frequency as the device under test.

According to another aspect of the present disclosure, the processing module is configured to simulate the at least one radar target and the at least one additional event over a predefined time interval. In some embodiments, the at least one radar target and the at least one additional event may be simulated for a (consecutive) set of points in time within the time interval. Thus, a particular scenario comprising the at least one radar target and the at least one additional event is simulated over the predefined time interval instead of merely simulating a sequence of snapshots of individual scenarios. In other words, the at least one radar target simulated as well as the at least one additional event simulated both may have a time-dependency or rather time-varying characteristics.

For example, the radar target simulation system or rather the processing module may simulate a complete braking maneuver of the radar target or rather the device under test, e.g. a complete braking maneuver of a car, and all the dynamic changes of the situation associated therewith.

In a further embodiment of the present disclosure, the processing module is configured to temporally synchronize the simulation of the at least one radar target and the simulation of the at least one additional event. In other words, the simulation of the at least one radar target and the simulation of the at least one additional event are temporally aligned such that a desired test scenario for the device under test is simulated correctly.

As mentioned above, the simulation of the radar target corresponds to the relative movement of the radar target and the device under test according to the radar target scenario. The simulation of the at least one additional event further specifies environmental impacts or rather effects.

In some embodiments, the processing module is configured to simulate several additional events simultaneously or consecutively. Accordingly, several different additional events may be simulated simultaneously, such that an even more complex testing scenario for testing the device under test is provided.

Alternatively or additionally, several different additional events may be simulated consecutively, such that different testing scenarios for the device under test are provided. This way, the performance of the device under test can be tested for different use cases.

According to an aspect of the present disclosure, the processing module is configured to choose at least one additional event from a set of additional events according to a predefined rule or statistically. The individual additional events of the set of additional events may be associated with different test scenarios for the device under test. Accordingly, the device under test may be tested under different test scenarios by choosing one or several additional events from the set of additional events.

For example, several different additional events may be chosen according to a certain test routine either based on the predefined rule or statistically. In other words, the different additional scenarios may be chosen based on a fixed rule, for example based on a heuristic rule.

Alternatively, the at least one additional event may be chosen statistically, i.e. randomly or pseudo-randomly. Thus, not all possible testing scenarios being associated with the individual additional events may be simulated for every device under test. Instead, a representative sample of different additional events may be selected statistically, such that a representative statistic test is provided by the selection of different additional events.

The processing module may comprise a memory, wherein the set of additional events may be stored in the memory. Additionally, output signals associated with the respective additional events may be stored in the memory.

According to an embodiment of the present disclosure, the processing module is configured to generate the output signal based on at least one of a simulated trajectory of the radar target, an angle of the radar target with respect to the device under test, and a velocity of the radar target. Therein and in the following, the "angle of the radar target" is understood to be the angle between a (main) axis of the radar target, e.g. the longitudinal axis of a vehicle, and a connecting line between the device under test and the simulated radar target, which is also called boresight.

According to another embodiment of the present disclosure, the processing module is configured to generate a first preliminary output signal based on the simulation of the at least one radar target, wherein the processing module is configured to generate a second preliminary output signal based on the simulation of the at least one additional event. In other words, the at least one radar target and the at least one additional event may be simulated independently of each other.

According to another aspect of the present disclosure, the processing module is configured to temporally synchronize the first preliminary output signal and the second preliminary output signal at last over a predefined time interval. Thus, the at least one radar target and the at least one additional event may be simulated independently of one another, but they may be temporally synchronized in order to create a certain testing scenario for the device under test.

For example, the first output signal is associated with a driving car (in front of the device under test), while the second output signal is associated with a pedestrian walking onto the street, and effects associated with a braking of the car due to the pedestrian walking onto the street. The simulation of the radar target (i.e. the car in this case) and of the additional event (the pedestrian walking onto the street and the effects associated with the braking, namely a tilting of the car) are synchronized such that a realistic testing scenario is obtained, e.g. that the (simulated) pedestrians walks onto the street in front of the (simulated) car. The tilting of the car that is an effect associated with the braking may result in a different radar cross section of the car due to the tilting movement.

In a further embodiment of the present disclosure, the processing module is configured to superpose the first preliminary output signal and the second preliminary output signal in order to generate the output signal for the antenna array. In other words, the at least one radar target and the at least one additional event may be simulated independently of each other, and the independent simulations are superposed in order to generate the output signal.

The first preliminary output signal and the second preliminary output signal may be temporally synchronized, and the synchronized preliminary output signals may be superposed in order to generate the output signal.

In some embodiments, the antenna array is configured to generate and transmit a wireless test signal based on the output signal. Therein, the wireless test signal is generated such that it simulates a reflection of the radar signal generated by the device under test in the scenario simulated by the processing module.

The radar target simulation may further comprise an analysis circuit or module, wherein the device under test is configured to receive the test signal and to generate a set of measurement data based on the test signal, and wherein the analysis module is configured to assess a performance of the device under test based on the set of measurement data. In other words, the test signal, which simulates a certain scenario, is evaluated by the device under test. Thus, the measurement data relates to an assessment of the simulated scenario by the device under test. Accordingly, the performance of the device under test can be evaluated by comparing the measurement data to the actually simulated scenario.

According to an aspect of the present disclosure, the set of measurement data is associated with an estimate of at least one property of the radar target or at least one property of the environment of the radar target. Accordingly, the analysis module may be configured to compare the estimated properties of the simulated radar target and/or the estimated properties of the simulated environment with the actual properties of the simulated radar target and/or the actual properties of the simulated environment. The performance of the device under test may be assessed based on the comparison.

In a further embodiment of the present disclosure, the radar target simulation system is established as an automotive radar target simulation system. Accordingly, the device under test may be a motor vehicle having an automotive radar system. For example, the automotive radar system is part of a driver assistance system such as an adaptive cruise control, an emergency brake system or a lane-keeping assistant. The automotive radar system may also be part of an automatic driving system that is configured to control the vehicle at least partially automatic, in particular autonomous.

Alternatively, the device under test may be any other kind of vehicle having a radar system. For example, the device under test may be a plane, a ship or a utility vehicle such as a truck.

Alternatively, the device under test may be established as a stationary radar system.

Embodiments of the present disclosure further provide a radar target simulation method for simulating at least one radar target. In an embodiment, the radar target simulation method comprises the following steps:

receiving a radar signal from a device under test by an antenna array, thereby generating an input signal;

simulating at least one radar target based on the input signal by a processing module;

simulating at least one additional event by the processing module, the at least one additional event being associated with at least one of the at least one radar target and an environment of the at least one radar target; and generating an output signal for the antenna array based on the simulation of the at least one radar target and based on the simulation of the at least one additional event by the processing module.

In some embodiments, the radar target simulation system described above is configured to perform the radar target simulation method.

Regarding the advantages and further properties of the radar target simulation method, reference is made to the explanations given above with respect to the radar target simulation system, which also hold for the radar target simulation method and vice versa.

According to an aspect of the present disclosure, the additional event comprises at least one of an static object in the environment, a dynamic object in the environment, an effect associated with an acceleration of the radar target, a change of a radar cross section of the radar target, an effect associated with a three-dimensional movement of the radar target, a multipath propagation of a radar signal reflected by the simulated radar target, and an interference source generating an interference radar signal.

For example, the additional event is associated with an effect that occurs when starting the radar target or rather the device under test, i.e. an initial acceleration of the radar target or rather device under test.

In some embodiments, the at least one additional event may comprise a yawing, pitching and/or rolling of the radar target during the acceleration.

As a further example, the at least one additional event may be associated with an effect resulting from a sudden slowdown or stop of the radar target or rather the device under test, i.e. with a significant deceleration of the radar target or rather the device under test.

In general, the interference source may be any source of radar waves that have an equal or similar wavelength as the radar waves generated or received by the device under test. For example, the interference source may be another electronic device transmitting on an equal or similar frequency as the device under test.

According to another aspect of the present disclosure, the at least one radar target and the at least one additional event are simulated over a predefined time interval. In some embodiments, the at least one radar target and the at least one additional event may be simulated for a (consecutive) set of points in time within the time interval. Thus, a particular scenario comprising the at least one radar target and the at least one additional event is simulated over the predefined time interval instead of merely simulating a sequence of snapshots of individual scenarios.

For example, the radar target simulation system or rather the processing module may simulate a complete braking maneuver of the radar target (simulated distance between the radar target simulated and the device under test reduces fast) or rather the device under test (simulated distance between the radar target simulated and the device under test increases fast), e.g. a complete braking maneuver of a car, and all the dynamic changes of the situation associated therewith.

In a further embodiment of the present disclosure, the at least one additional event is chosen from a set of additional events according to a predefined rule or statistically. The individual additional events of the set of additional events may be associated with different test scenarios for the device under test. Accordingly, the device under test may be tested under different test scenarios by choosing one or several additional events from the set of additional events.

For example, several different additional events may be chosen according to a certain test routine either based on the predefined rule or statistically. In other words, the different additional scenarios may be chosen based on a fixed rule, for example based on a heuristic rule.

Alternatively, the at least one additional event may be chosen statistically, i.e. randomly or pseudo-randomly. Thus, not all possible testing scenarios being associated with the individual additional events may be simulated for every device under test. Instead, a representative sample of different additional events may be selected statistically, such that a representative statistic test is provided by the selection of different additional events.

A first preliminary output signal may be generated based on the simulation of the at least one radar target, and a second preliminary output signal may be generated based on the simulation of the at least one additional event. In other words, the at least one radar target and the at least one additional event may be simulated independently of each other.

In some embodiments, the first preliminary output signal and the second preliminary output signal are temporally synchronized at last over a predefined time interval. Thus, the at least one radar target and the at least one additional event may be simulated independently of one another, but they may be temporally synchronized in order to create a certain testing scenario for the device under test.

For example, the first output signal is associated with a driving car, while the second output signal is associated with a pedestrian walking onto the street, and effects associated with a braking of the car due to the pedestrian walking onto the street. The simulation of the radar target (i.e. the car in this case) and of the additional event (the pedestrian walking onto the street and the effects associated with the braking, namely a tilting of the car) are synchronized such that a realistic testing scenario is obtained, e.g. that the (simulated) pedestrians walks onto the street in front of the (simulated) car. The tilting of the car that is an effect associated with the braking may result in a different radar cross section of the car due to the tilting movement.

According to another aspect of the present disclosure, the first preliminary output signal and the second preliminary output signal are superposed in order to generate the output signal for the antenna array. In other words, the at least one radar target and the at least one additional event may be simulated independently of each other, and the independent simulations are superposed in order to generate the output signal.

The first preliminary output signal and the second preliminary output signal may be temporally synchronized, and the synchronized preliminary output signals may be superposed in order to generate the output signal.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
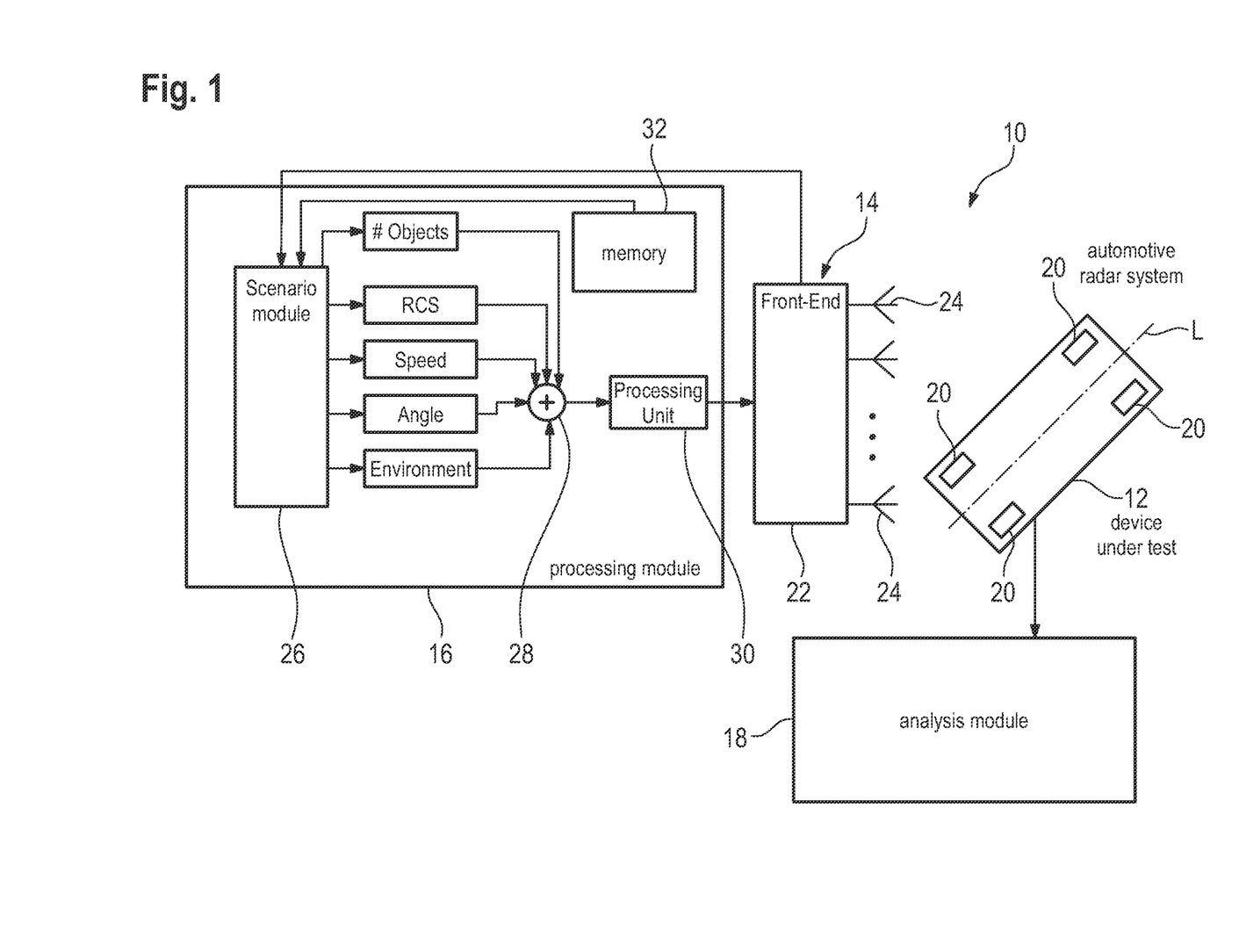
FIG. 1 shows a block diagram of a radar target simulation system according to an embodiment of the present disclosure.

FIG. 1 schematically shows a radar target simulation system 10 comprising a device under test 12, an antenna array 14, a processing module 16 composed of one or more circuits, and an analysis module 18 composed of one or more circuits.

Therein and in the following, the term "module" is understood to described or include suitable circuitry such as hardware, suitable software, or a combination of hardware and software that is configured to have a certain functionality. The hardware may, inter alia, comprise a CPU, a GPU, an FPGA, an ASIC, or other types of electronic processing circuitry.

The device under test 12 may be a motor vehicle having an automotive radar system 20. For example, the automotive radar system 20 is part of a driver assistance system such as an adaptive cruise control, an emergency brake system or a lane-keeping assistant. The automotive radar system 20 may also be part of an automatic driving system that is configured to automatically control the vehicle at least partially, in particular autonomously. For instance, a parking assistant and/or a completely autonomous driving system of the motor vehicle may use the automotive radar system 20.

Alternatively, the device under test 12 may be any other kind of vehicle having a radar system 20. For example, the device under test 12 may be a plane, a ship or a utility vehicle such as a truck. Alternatively, the device under test 12 may be established as a stationary radar system.

The antenna array 14 comprises a front end 22 and several antennas 24 that are each connected to the front end 22 in a signal transmitting manner Therein and in the following, the term "connected in a signal transmitting manner" is understood to denote a cable-based or wireless connection that is configured to transmit signals between the respective devices or components.

In general, signal transmitting connections are depicted as arrows in FIG. 1. The respective tips indicate the direction of the data streams associated with the signal transmitting connections.

The processing module 16 comprises a scenario module 26, a combiner unit 28, a processing unit 30, and a memory 32. Each one of these components may comprising one or more circuits for carrying out its respective functionality, which will be described in more detail below. Alternatively, the functionality of these components can be combined into one or more circuits.

As shown in FIG. 1, the scenario module 26 is connected to the front end 22, to the combiner unit 28, and to the memory 32 in a signal transmitting manner. The processing unit 30 is connected to the combiner unit 28 and to the front end 22 in a signal transmitting manner Generally speaking, the radar test system 10 is configured to test the device under test 12, for example the radar system 20 of the device under test 12. More precisely, the radar system 10 is configured to perform a radar target simulation method that is described in the following with reference to FIG. 2.

Figure 2:
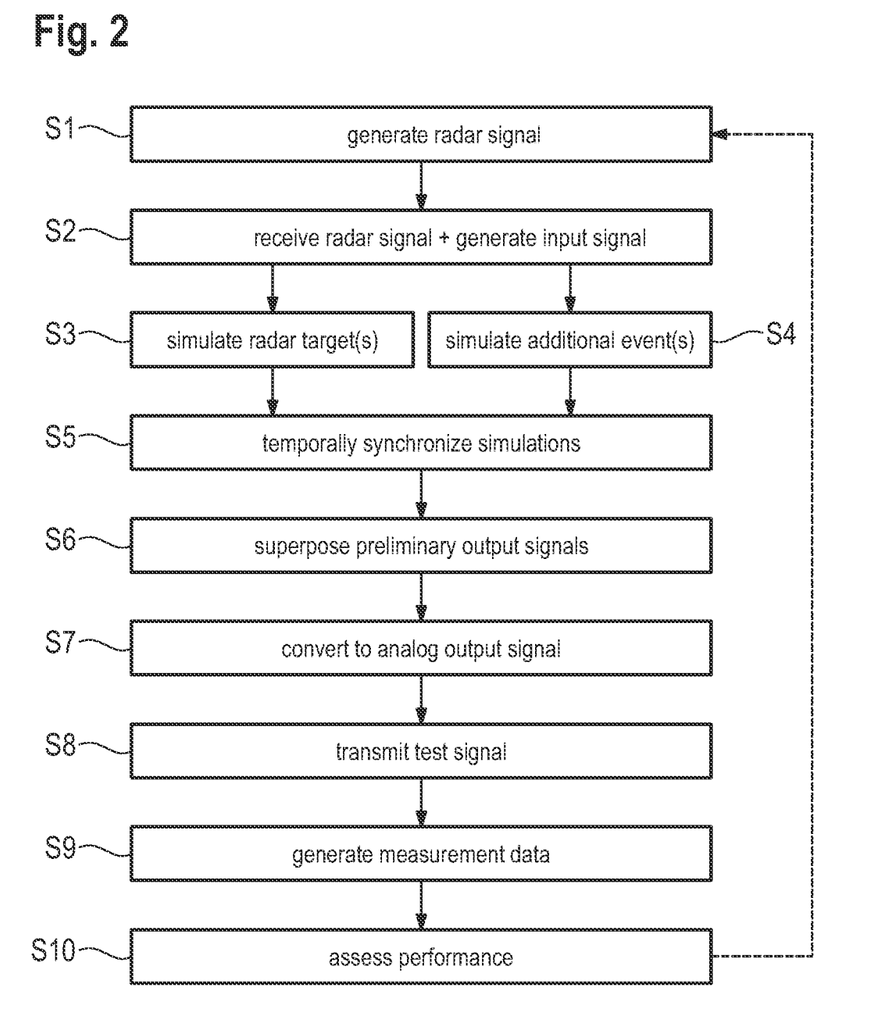
FIG. 2 shows a flow chart of a radar target simulation method according to an embodiment of the present disclosure.

A radar signal is generated by the device under test 12, or more precisely by the automotive radar system 20 (step S1).

The radar signal is transmitted to the antenna array 14 and received by the antennas 24, wherein the front end 22 generates an input signal based on the received radar signal (step S2).

The input signal is forwarded to the processing module 16, or more precisely to the scenario module 26 of the processing module 16. The scenario module 26 simulates at least one radar target based on the input signal received from the front end 22, thereby generating a first preliminary output signal (step S3).

In some embodiments, the data necessary for the simulation of the at least one radar target and/or the corresponding first preliminary output signal may be loaded from the memory 32. For example, the radar target may be a vehicle, a plane, a ship, another type of moving or stationary object, a cyclist, or a pedestrian.

In some embodiments, the scenario module 26 may simulate one or several radar targets, wherein a respective trajectory is simulated for each of the radar targets. Generally, the radar target(s) or rather the respective trajectory defines the relative movement of the device under test 12 and the corresponding radar target during a testing scenario applied.

Moreover, the scenario module 26 may simulate an angle of the at least one radar target with respect to the device under test 12, and a corresponding modification of a radar cross section of the at least one radar target. Therein and in the following, the "angle of the radar target" is understood to be the angle between a (main) axis of the radar target, e.g. the longitudinal axis of a vehicle, and a connecting line between the device under test 12 and the simulated radar target. Alternatively, the term "angle of the radar target" may refer to an angle between the (main) axis of the radar target and a (main) axis L of the device under test 12.

Moreover, the scenario module 26 may simulate that the at least one radar target has a certain velocity. For example, the scenario module 26 may simulate a Doppler shift that is caused by the velocity of the at least one radar target.

The scenario module 26 further simulates at least one additional event, wherein the at least one additional event is associated with the at least one radar target and/or an environment of the at least one radar target, thereby generating a second preliminary output signal (step S4).

In some embodiments, the data necessary for the simulation of the at least one additional event and/or the corresponding second preliminary output signal may be loaded from the memory 32.

In general, the at least one additional event relates to a scenario deviating from a standard scenario, in which only the radar target would be simulated, wherein the radar target would be stationary or would move at a constant velocity.

For example, the at least one additional event may comprise at least one of a static object in the environment, a dynamic object in the environment, an effect associated with an acceleration of the radar target, a change of a radar cross section of the radar target, an effect associated with a three-dimensional movement of the radar target, a multipath propagation of a radar signal reflected by the simulated radar target, and an interference source generating an interference radar signal.

For example, the additional event is associated with an effect caused by a starting of the radar target or rather the device under test 12, i.e. an initial acceleration of the radar target or rather the device under test 12. In some embodiments, the at least one additional event may comprise a yawing, pitching and/or rolling during an occurring acceleration, and a change of the radar cross section of the radar target due to the yawing, pitching and/or rolling of the radar target itself or rather the device under test 12.

The scenario may comprise a respective yawing, pitching and/or rolling of the device under test 12 that is simulated appropriately by simulating the radar target accordingly. As mentioned above, the radar target simulated corresponds to the relative orientation and/or movement between the radar target and the device under test 12.

As a further example, the at least one additional event may be associated with an effect of a sudden slowdown or stop of the radar target or rather the device under test 12, i.e. with a significant deceleration.

Alternatively or additionally, the scenario module 26 may simulate that the radar waves emitted by the device under test 12 are reflected at several objects. For example, the radar signal may be simulated to be first reflected by the radar target, and then by one or more further objects, such as trees, tunnel walls, etc.

The first preliminary output signal and the second preliminary output signal are temporally synchronized by the scenario module 26 (step S5). In other words, the simulation of the at least one radar target and the simulation of the at least one additional event are temporally aligned such that a desired test scenario for the device under test 12 is simulated correctly.

The synchronized preliminary output signals are superposed by the combiner unit 28, thereby generating an output signal that is associated with both the at least one radar target and the at least one additional event (step S6).

In some embodiments, the output signal corresponds to a simulation of the at least one radar target and the at least one additional event over a (consecutive) set of points in time within a predefined time interval. Thus, a particular scenario comprising the at least one radar target and the at least one additional event is simulated over the predefined time interval.

The output signal may be converted into an analog output signal that is suitable for the antenna array 14 by the processing unit 30 (step S7), at least if the output signal of the combiner unit 28 is a digital signal.

The antenna array 14 generates and transmits a wireless test signal based on the output signal received from the processing unit 30 (step S8).

In general, the test signal is a simulation of reflections of the radar signal in the test scenario simulated by the processing module 16. In other words, the test signal looks like as if the radar waves were reflected at the at least one radar target, and as if the radar waves were additionally manipulated due to the at least one additional event.

The device under test 12, or rather the automotive radar system 20, receives the test signal and generates a set of measurement data based on the test signal (step S9). In general, the set of measurement data is associated with an estimate of at least one property of the radar target and/or at least one property of the environment of the radar target by the device under test 12, or rather by the automotive radar system 20.

A performance of the automotive radar system 20 is assessed based on the set of measurement data by the analysis module 18 (step S10). The analysis module 18 may be configured to compare the estimated properties of the simulated radar target and/or the estimated properties of the simulated environment with the actual properties of the simulated radar target and/or the actual properties of the simulated environment in order to assess the performance of the automotive radar system 20.

In other words, the test signal, which simulates a certain scenario, is evaluated by the automotive radar system 20. Thus, the measurement data relates to an assessment of the simulated scenario by the automotive radar system 20. Accordingly, the performance of the automotive radar system 20 can be evaluated by comparing the measurement data to the actually simulated scenario.

With the method described above, a certain test scenario comprising the at least one radar target and the at least one additional event is simulated over the predefined time interval.

The radar target simulation system 10 may be configured to simulate several different test scenarios consecutively, i.e. the steps S1 to S10 described above may be repeated for at least one further test scenario, for example for several further test scenarios.

In each different test scenario, a different radar target and/or a different additional event may be simulated.

For this purpose, a set of different additional events and/or a set of radar targets and their respective properties may be stored in the memory 32.

In each iteration of the steps S1 to S10 described above, the processing module 16, or rather the scenario module 26, may choose the at least one additional event from the set of additional events according to a predefined rule or statistically.

For example, several different additional events may be chosen according to a certain test routine either based on the predefined rule or statistically. In other words, the different additional scenarios may be chosen based on a fixed rule, e.g. based on a heuristic rule.

Alternatively, the at least one additional event may be chosen statistically, i.e. randomly or pseudo-randomly. Thus, not all possible testing scenarios being associated with the individual additional events may be simulated for every device under test 12. Instead, a representative sample of different additional events may be selected statistically, such that a representative statistic test is provided by the selection of different additional events.

Summarizing, the radar target simulation system 10 described above provides a possibility for testing the device under test 12 in several realistic scenarios, as the additional events provide a more realistic representation of a use case scenario of the device under test 12.

Therein, a dynamic evolution of a test scenario comprising the at least one radar target and the at least one additional event is simulated over the predefined time interval. Thus, a complete, realistic scenario is simulated, instead of only simulating one or several snapshots of a scenario.

The radar target simulation system 10, including such components as, for example, the measurement instrument 16, the analysis module 18, and/or the scenario module 26 is configured to perform one or more steps schematically shown, for example, in FIG. 2. In some embodiments, one or more of these components includes one or more computer-readable media containing computer readable instructions embodied thereon that, when executed by one or more computer circuits (contained in or associated with the radar target simulation system 10 or components thereof), cause the one or more computer circuits to perform one or more steps of the method of FIG. 2 described above. In some embodiments, the one or more computer circuits includes a microprocessor, a microcontroller, a central processing unit, a graphics processing unit (GPU), a digital signal processor (DSP), etc.

In some embodiments, the one or more computer-readable media contains computer readable instructions embodied thereon that, when executed by the one or more computer circuits, cause the one or more computer circuits to perform one or more steps of any of the methods of claims 15-21.

As described briefly above, certain embodiments disclosed herein utilize circuitry (e.g., one or more circuits) in order to implement protocols, methodologies or technologies disclosed herein, operably couple two or more components, generate information, process information, analyze information, store information, display information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices or computer circuits such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of the modules, units, etc., described above, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A radar target simulation system for simulating at least one radar target, the radar target simulation system comprising a processing circuit and an antenna array that is connected with the processing circuit,
the antenna array being configured to receive a radar signal from a device under test, thereby generating an input signal, and
the processing circuit being configured to:
receive the input signal generated by the antenna array,
simulate the at least one radar target based on the input signal,
choose several different additional events from a set of additional events randomly or pseudo-randomly, such that a representative statistic test is provided by the selection of different additional events,
simulate the several different additional events simultaneously and/or consecutively, the several different additional events being associated with at least one of the at least one radar target and an environment of the at least one radar target, respectively, and
generate an output signal for the antenna array based on the simulation of the at least one radar target and based on the simulation of the respective additional event,
wherein the processing circuit is further configured to:
generate a first preliminary output signal based on the simulation of the at least one radar target;
generate a second preliminary output signal based on the simulation of the respective additional event; and
temporally synchronize the first preliminary output signal and the second preliminary output signal at least over a predefined time interval, such that interactions between the at least one radar target and the respective additional event are simulated.

2. The radar target simulation system of claim 1, wherein the different additional events comprise at least one of an static object in the environment, a dynamic object in the environment, an effect associated with an acceleration of the radar target, a change of a radar cross section of the radar target, an effect associated with a three-dimensional movement of the radar target, a multipath propagation of a radar signal reflected by the simulated radar target, and an interference source generating an interference radar signal, respectively.

3. The radar target simulation system of claim 1, wherein the processing circuit is configured to simulate the respective radar target and the at least one additional event over a predefined time interval.

4. The radar target simulation system of claim 1, wherein the processing circuit is configured to temporally synchronize the simulation of the respective radar target and the simulation of the at least one additional event at least over the predefined time interval.

5. The radar target simulation system of claim 1, wherein the processing circuit is configured to generate the output signal based on at least one of a simulated trajectory of the radar target, an angle of the radar target with respect to the device under test, and a velocity of the radar target.

6. The radar target simulation system of claim 1, wherein the processing circuit is configured to superpose the first preliminary output signal and the second preliminary output signal in order to generate the output signal for the antenna array.

7. The radar target simulation system of claim 1, wherein the antenna array is configured to generate and transmit a wireless test signal based on the output signal.

8. The radar target simulation system of claim 7, further comprising an analysis circuit, wherein the device under test is configured to receive the test signal and to generate a set of measurement data based on the test signal, and wherein the analysis circuit is configured to assess a performance of the device under test based on the set of measurement data.

9. The radar target simulation system of claim 8, wherein the set of measurement data is associated with an estimate of at least one property of the radar target or at least one property of the environment of the radar target.

10. The radar target simulation system of claim 1, wherein the radar target simulation system is established as an automotive radar target simulation system.

11. A radar target simulation method for simulating at least one radar target, the radar target simulation method comprising:
receiving a radar signal from a device under test by an antenna array, thereby generating an input signal;
simulating at least one radar target based on the input signal by a processing circuit;
simulating at least one additional event by the processing circuit, the at least one additional event being associated with at least one of the at least one radar target and an environment of the at least one radar target, wherein the at least one additional event comprises an acceleration of the at least one radar target, wherein the at least one additional event further comprises a movement of the at least one radar target in at least one direction that is caused by the acceleration of the at least one radar target, wherein the at least one direction is different from the direction of the acceleration, wherein the movement of the at least one radar target in the at least one direction that is caused by the acceleration of the at least one radar target comprises a yawing, pitching and/or rolling of the radar target due to the acceleration of the at least one radar target; and
generating an output signal for the antenna array based on the simulation of the at least one radar target and based on the simulation of the at least one additional event by the processing circuit;
generating a first preliminary output signal based on the simulation of the at least one radar target; and
generating a second preliminary output signal based on the simulation of the at least one additional event,
wherein the first preliminary output signal and the second preliminary output signal are temporally synchronized at last over a predefined time interval such that interactions between the at least one radar target and the at least one additional event are simulated.

12. The radar target simulation method of claim 11, wherein the additional event comprises at least one of an static object in the environment, a dynamic object in the environment, a change of a radar cross section of the radar target, an effect associated with a three-dimensional movement of the radar target, a multipath propagation of a radar signal reflected by the simulated radar target, and an interference source generating an interference radar signal.

13. The radar target simulation method of claim 11, wherein the at least one radar target and the at least one additional event are simulated over a predefined time interval.

14. The radar target simulation method of claim 11, wherein the at least one additional event is chosen from a set of additional events according to a predefined rule or statistically.

15. The radar target simulation method of claim 11, wherein the first preliminary output signal and the second preliminary output signal are superposed in order to generate the output signal for the antenna array.

16. A radar target simulation system for simulating at least one radar target, the radar target simulation system comprising a processing circuit and an antenna array that is connected with the processing circuit, the antenna array being configured to receive a radar signal from a device under test, thereby generating an input signal, and the processing circuit being configured to:

receive the input signal generated by the antenna array, simulate the at least one radar target based on the input signal, simulate at least one additional event, the at least one additional event being associated with at least one of the at least one radar target and an environment of the at least one radar target, wherein the at least one additional event comprises an acceleration of the at least one radar target, wherein the at least one additional event further comprises a movement of the at least one radar target in at least one direction that is caused by the acceleration of the at least one radar target, wherein the at least one direction is different from the direction of the acceleration, wherein the movement of the at least one radar target in the at least one direction that is caused by the acceleration of the at least one radar target comprises a yawing, pitching and/or rolling of the radar target due to the acceleration of the at least one radar target, and wherein the at least one additional event comprises a change of a radar cross section of the at least one radar target due to the yawing, pitching and/or rolling of the radar target, and generate an output signal for the antenna array based on the simulation of the at least one radar target and based on the simulation of the at least one additional event, wherein the processing circuit is further configured to: generate a first preliminary output signal based on the simulation of the at least one radar target; generate a second preliminary output signal based on the simulation of the at least one additional event; and temporally synchronize the first preliminary output signal and the second preliminary output signal at least over a predefined time interval, such that interactions between the at least one radar target and the at least one additional event are simulated.

* * * * *